United States Patent
Lagreve

(10) Patent No.: US 12,384,877 B2
(45) Date of Patent: Aug. 12, 2025

(54) PET BASED POLYMERIC MATRIX FOR ELECTRIC WIRES

(71) Applicant: ACOME, Paris (FR)

(72) Inventor: Christian Lagreve, La Chapelle Biche (FR)

(73) Assignee: ACOME, Paris (FR)

( * ) Notice: Subject to any disclaimer, the term of this patent is extended or adjusted under 35 U.S.C. 154(b) by 429 days.

(21) Appl. No.: 17/771,582

(22) PCT Filed: Oct. 29, 2020

(86) PCT No.: PCT/FR2020/051956
§ 371 (c)(1),
(2) Date: Apr. 25, 2022

(87) PCT Pub. No.: WO2021/084210
PCT Pub. Date: May 6, 2021

(65) Prior Publication Data
US 2022/0380526 A1    Dec. 1, 2022

(30) Foreign Application Priority Data

Oct. 30, 2019  (FR) ..................................... 19 12232

(51) Int. Cl.
| | |
|---|---|
| C08G 63/183 | (2006.01) |
| C08K 3/22 | (2006.01) |
| C08K 5/03 | (2006.01) |
| C08K 5/11 | (2006.01) |
| C08K 5/28 | (2006.01) |
| C08K 5/3492 | (2006.01) |
| H01B 3/42 | (2006.01) |
| C08K 3/08 | (2006.01) |

(52) U.S. Cl.
CPC .......... *C08G 63/183* (2013.01); *C08K 3/2279* (2013.01); *C08K 5/03* (2013.01); *C08K 5/11* (2013.01); *C08K 5/28* (2013.01); *C08K 5/34924* (2013.01); *H01B 3/421* (2013.01); *C08K 2003/0875* (2013.01)

(58) Field of Classification Search
CPC .......... C08G 63/183; C08K 2003/0875; C08K 3/22; C08K 3/2279; C08K 5/03; C08K 5/11; C08K 5/28; C08K 5/34924; C08K 5/37; C08L 23/0869; C08L 23/0884; C08L 67/02; H01B 3/421
USPC ...................................................... 528/308.6
See application file for complete search history.

(56) References Cited

U.S. PATENT DOCUMENTS

| | | | | |
|---|---|---|---|---|
| 5,885,709 | A | * 3/1999 | Wick | D01F 6/62 525/437 |
| 6,303,866 | B1 | * 10/2001 | Lagreve | H01B 3/422 174/110 SR |
| 2005/0252679 | A1 | 11/2005 | Chang et al. | |
| 2009/0255708 | A1 | 10/2009 | Sato et al. | |

FOREIGN PATENT DOCUMENTS

| | | | |
|---|---|---|---|
| CN | 101987910 | * | 3/2011 |
| CN | 102604338 A | | 7/2012 |
| CN | 102604339 A | | 7/2012 |
| CN | 110054872 | * | 7/2019 |
| EP | 2719529 | * | 1/2017 |
| JP | 2005105055 | * | 4/2000 |
| JP | 2002293981 | * | 10/2002 |
| JP | 2005105055 A | | 4/2005 |
| JP | 2016065135 | * | 4/2016 |
| JP | 107974058 | * | 5/2018 |
| WO | 9930330 A1 | | 6/1999 |

OTHER PUBLICATIONS

Written Opinion of the International Searching Authority for PCT/FR2020/051956—Translated (Year: 2021).*
Antioxidant 1024 same as Irganox MD 1024—Tech Data, retrieved on Oct. 9, 2024 (Year: 2024).*
Antioxidant 1010 same as Irganox 1010—Tech DATA, retrieved on Oct. 9, 2024 (Year: 2024).*
Matthew D. Walter et al "Overview of Flame Retardants Including Magnesium Hydroxide", 2022 (Year: 2022).*
R. N. Rothon et al "Flame retardant effects of magnesium hydroxide" Polymer Degradation and Stability 54 (1996) 383-385 (Year: 1996).*
International Search Report mailed Jan. 21, 2021, in corresponding to International Application No. PCT/FR2020/051956; 5 pages (with English Translation).

\* cited by examiner

*Primary Examiner* — Ling Siu Cho
*Assistant Examiner* — Ronald Grinsted
(74) *Attorney, Agent, or Firm* — Maier & Maier, PLLC

(57) ABSTRACT

A polymeric matrix including: 50 to 80%, preferably 64 to 73% PET; 18 to 50%, preferably 20 to 28% of a mixture of polyolefins; 0.1 to 15%, preferably 0.5 to 7% of at least one flame-retardant additive; 0 to 2%, preferably 0.2 to 1% of at least one antioxidant; 0 to 2% preferably 0.2 to 1% of at least one crosslinking promoter; 0 to 2%, preferably 0.2 to 1% of at least one anti-hydrolysis agent, the percentages being by weight of the total weight of the matrix. Also, the use of polymeric matrix in manufacturing electrical cables.

14 Claims, No Drawings

PET BASED POLYMERIC MATRIX FOR ELECTRIC WIRES

FIELD

The invention relates to a polymer material suitable for use as an insulator for electric cables, in particular for the automotive industry.

BACKGROUND

Automobiles contain more and more electrical cables, which are subjected to very significant stresses, in particular from temperature and oxidation. Further, in order to limit the automobiles fuel consumption and the impact on the environment, manufacturers seek to reduce the weight of the various materials constituting the vehicles. For this purpose, they in particular reduced the section of electrical conductors, the copper strands. Conventionally, these strands have a section in the range of 0.35 mm$^2$, or even in the range of 0.13 mm$^2$.

These strands are covered with an insulating material, conventionally based on PVC, and must be fire and abrasion resistant while remaining flexible. In particular they must satisfy the criteria set by the ISO 6722 standard, in particular in terms of:
- pressure at high temperature;
- abrasion;
- low temperature winding;
- long-term thermal aging, meaning over 3000 hours.

These insulating materials, generally composed of PVC in mixture or of thermoplastic or crosslinked polyolefins, have satisfactory resistance to various stresses. In the case of PVC compounds, these insulating materials require the presence of plasticizers.

However, the use of this type of insulator causes problems during connectorization of cables which is generally done by ultrasonic welding. The efficiency of this welding may be affected by the presence of some fatty additives in the composition of the insulating material which migrate to the surface of the copper.

During extrusion and or welding, the PVC is heated to temperatures in the range of 190° C. and the plasticizers that it contains, in particular the phthalate or trimellitate type liquid plasticizers, are released and disturb the friction properties between the conductors, which reduces the quality of the weld.

Consequently, there is still a need for companies to obtain a polymer material suitable for use as an electrical cable insulator which satisfy ISO 6722 standard types 2 and 3 (operating temperature respectively of 105° C. and 125° C. for 3000 hours) without affecting the connectorization.

Alternatives for replacing the use of PVC for automotive cabling have been developed.

For example, the document WO 99/030330 A1 describes an electric wire made up of a conducting metal wire around which an alloy of polymers comprising in particular polybutylene terephthalate (PBT) is extruded. PBT is conventionally used for forming the polymeric matrix of insulators for electrical cables. The properties related to the crystalline structure of PBT are known in particular for inducing a barrier effect against small sized molecules, allowing the insulator composed of a polymeric matrix comprising PBT to provide a good resistance against hydrolysis.

However, these solutions require the use of virgin plastics and do not allow the use of recycled plastic materials.

In 2016 the global plastic production was about 396 million tons and continues to increase, in particular for packaging functions, with risks of dispersing waste in nature. The collection and recycling of these materials constitutes a solution for reducing release of wastes into the nature. According to Roland Geyer participating in an opinion given at the University of Georgia on plastic wastes, the average recycling rate in Europe (one of the highest in the world) is only 26%.

There is therefore a need to develop insulators capable of having good physical properties compatible with environmental issues.

SUMMARY

The applicant developed, after extensive research, a polymeric matrix comprising mainly polyethylene terephthalate PET. This matrix can be used in manufacturing electrical cables, in particular for automotive use.

The present invention therefore relates to a polymeric matrix comprising:
- 50 to 80%, preferably 64 to 73% PET;
- 18 to 50%, preferably 20 to 28% of a mixture of polyolefins;
- 0.1 to 15%, preferably 0.2 to 7% of at least one flame-retardant additive;
- 0 to 2%, preferably 0.2 to 1% of at least one antioxidant;
- 0 to 2%, preferably 0.2 to 1% of at least one crosslinking promoter;
- 0 to 2%, preferably 0.2 to 1% of at least one anti-hydrolysis agent the PET being mostly recycled PET, and the percentages being by weight of the total weight of the matrix.

DETAILED DESCRIPTION

In the present invention, "mostly recycled PET" is understood to mean that over 50% by weight, preferably over 75% by weight, and more preferably even over 80% by weight of the PET used in the composition is recycled PET.

Advantageously the all the PET used in the matrix is recycled PET.

Using recycled PET allows to limit the environmental impacts associated with plastic detritus.

Advantageously the recycled PET may be obtained from unrefined recycled materials.

The recycled PET for the polymeric matrix comes in particular from food packaging. Indeed, PET, which is mostly used for manufacturing in particular soda or mineral water bottles, benefits from a well-established collection and recycling chain and allows the production of food-grade rPET (recycled PET) for the production of new bottles. Colored recycled PET which cannot be used for manufacturing transparent bottles, is also used for manufacturing nonfood products like textile or industrial fibers. Thus, according to an embodiment of the invention, the recycled PET comes from transparent plastic bottles, more specifically from colored plastic bottles. The bottles are first grinded and washed in order to form flakes of variable shape, and then the PET is separated from the other constituents of the containers. The flakes are extruded in order to form amorphous pellets. This step allows to extract contaminants such as cardboard or labeling residues. At the end of this step, unrefined recycled PET which is also called amorphous recycled PET is obtained. The amorphous pellets can then be heated to 200° C. under vacuum for 8 hours. This operation allows the extraction of low molecular weight components and restores the recycled PET, commonly called rPET, to food grade. It also allows to extract the residual water formed by the transesterification reaction between the heated components, which also results in an increase of the viscosity of the polymer.

According to the invention, either amorphous or crystalline PET pellets or even flakes coming from the first sorting can be used. Environmentally and economically, it is advantageous to use amorphous PET pellets or even flakes sorted by color or advantageously flakes of different colors, in particular coming from white, green or red bottles.

Furthermore, the fact that the base materials may be unrefined by long term heating allows to reduce the processing steps for forming the polymeric matrix from said materials, and thus to further reduce the economic and environmental impact of the production process.

The amount of PET is from 50 to 80%, preferably from 64 to 73%. Below 50% of PET, the characteristics of resistance to aging in particular are not satisfying. Above 80%, the material formed from the polymeric matrix is too rigid and does not allow the use as an insulator for electrical cables.

In a specific embodiment, the mixture of polyolefins comprises at least one polar polyolefin and possibly a nonpolar polyolefin. The polar polyolefin may be selected among polar polymers containing polymerized or grafted groups such as maleic anhydride; glycidyl methacrylate; methyl, ethyl, butyl and hexyl acrylates; acrylic acid and salts thereof; vinyl acetate; ethylene/methyl acrylate copolymer; ethylene/butyl acrylate copolymer; ethylene/methyl acrylate/glycidyl methacrylate terpolymer; and mixtures thereof.

When it is present, the nonpolar polyolefin is in a minority amount compared to the one or more polar polyolefin(s), meaning that it represents under 50% by weight of the total weight of the mixture of polyolefins. This nonpolar polyolefin is selected among polypropylene, polyethylene, methylpentene, polybutylene, ethylene propylene diene, and mixtures thereof.

The presence of polyolefins in the polymeric matrix allows to provide the matrix a sufficient flexibility and necessary for the cabling application which could not be obtained with only PET.

The amount of polyolefin mixture is from 18 to 50%, preferably from 20 to 28%. Below 18%, the plasticizer effect is not sufficient and beyond 50% the abrasion resistance is not sufficient for use as an insulator for electric cables with small copper sections.

Advantageously, the flame-retardant additive in the polymeric matrix is selected among bromine, antimony, a brominated compound, an antimony compound or mixtures thereof, preferably antimony trioxide and decabromodiphenyl ethane.

The amount of flame-retardant additive is from 0.1 to 15%, preferably from 0.2 to 7%. This dosage is optimized for limiting as much as possible the technical and economic impact on the formulation. Below 0.1%, the fire resistance would be insufficient for automotive cabling applications, and beyond 15%, there is no additional advantage.

The antioxidant for the polymeric matrix may be any antioxidant used in polymers. For example, it may be selected among pentaerythritol tetrakis(3-(3,5-di-tert-butyl-4-hydroxyphenyl)propionate), 2',3-bis[3-[3,5-di-tert-butyl-4-hydroxyphenyl]propioyl] propionohydrazide, dioctadecyl 3,3'-thiodipropionate, or a mixture thereof. The purpose of the antioxidant is to protect the polyolefins from oxidation.

The polymeric matrix according to the invention may contain a crosslinking agent which can be 1,3,5-triallylisocyanurate or trimethylolpropane trimethylacrylate or a mixture thereof. This crosslinking of the polyolefin phase, in the case in which the cable is subject to electrons during an additional post-extrusion process, allows to enhance the mechanical properties of the high temperature matrix.

The anti-hydrolysis agent used in the matrix from the invention is a conventional agent used in this field. A polycarbodiimide type agent can be given as an example.

According to a specific embodiment, the polymeric matrix does not have a plasticizer. Plasticizer is understood to mean plasticizers conventionally used with PVC, in particular phthalates and trimellitates. Unlike PVC based insulators, the polymeric matrix according to the invention does not contain a plasticizer and therefore does not interfere during the connectorization.

Thus, the PET based polymeric matrix according to the invention can achieve flexibility characteristics similar to those of PVC based matrix because of the combination of PET and polyolefin, and does so without addition of plasticizer.

The absence of plasticizer within the composition allows to improve the quality of the weld. The resistance of the ultrasonic weld is better than that of PVC and of uniform quality.

The present invention also relates to the use of the polymeric matrix from the invention for manufacturing insulators for electrical conductor wires.

An object of the invention is also a cable comprising at least one electrical conductor wire covered by an insulating sleeve based on the previously defined polymeric matrix.

The cables according to the invention are cables conventionally used for automotive cabling, which have an electrical conductor wire with a section ranging from 0.08 to 0.75 mm$^2$.

Surprisingly, even though PET is amorphous, the inventors managed to get a PET based insulator having a resistance to hydrolysis equivalent to or better than that of PBT based insulators.

Advantageously, the recycled-PET based cables have a modulus over 1000 MPa which allows them to have an abrasion resistance equivalent to that of cables currently sold. In that way, the recycled-PET cables according to the invention have a performance in resistance to abrasion as good as cables formed from technical materials such as PBT, PA (polyamide) and TPE (thermoplastic polyester).

The cables composed of recycled-PET based polymeric matrix have high temperature aging and also a high temperature pressure resistance which meet the requirements of the ISO 6722 standard.

Typically, cables composed of a recycled-PET based polymeric matrix have satisfying properties in terms of aging at temperatures from 125 to 150° C. as measured according to the ISO 6722 standard.

Because there are no plasticizers in the polymeric matrix for the cables from the present invention, satisfying flexibility results can be obtained. Cables composed of a recycled-PET based polymeric matrix have an elongation at rupture and a winding at −40° C. meeting the criteria demanded by the ISO 62722 standard.

The characteristics in terms of resistance and flexibility of the insulating sleeve described above, serve to limit the thickness of the insulating sleeve without changing the properties thereof.

The cables are thus thinner, and the insulating sleeves are also thinner, which has the consequence of considerably reducing the weight of the cables. For equal performance, a weight savings of 30% compared to the equivalent PVC insulation is achieved.

Further, the use of recycled PET allows to considerably reduce the use of virgin materials for making the insulating sleeve. For example, the use of 65% recycled PET makes it possible to use only 200 g of virgin materials for insulating 1 km of wire, as compared to 950 g of PVC used on average. The use of recycled PET thus allows achieving savings of 75% on the resources needed, which is a considerable economic and ecological advantage.

The invention also relates to the use of a cable such as defined above for automotive cabling. Considering the weight improvement which could be obtained as explained above, the cables are entirely appropriate for addressing the objective of limiting the environmental impact.

Another object of the invention relates to a method for preparation of a cable such as previously described comprising:
the preparation of a polymeric matrix such as defined above;
the extrusion of the matrix around an electrical conductor; and possibly the crosslinking of the polymeric matrix.

The following examples are only presented as illustration and cannot be considered as limiting.

EXAMPLES

Different cables according to the invention have been prepared by extrusion of a polymeric matrix according to the invention around a strand of copper with 0.13 mm² section and 0.407 mm diameter.

The cables underwent tests listed in Table 1.

The compositions of the polymeric matrix constituting the tested sleeves are given in the following examples 1 to 6.

In the examples, the following commercial products were used:
ECOPET CB TH 80: Recycled PET sold by Paprec
ECOFLAKES CB TH: PET in flakes sold by Paprec
ECOPET CB: PET in amorphous pellets sold by Paprec
Irganox 1024: antioxidant sold by BASF
Irganox 1010: antioxidant sold by BASF.

Example 1

The cable was prepared by extrusion of a polymeric matrix with the following composition around a copper strand:
64.46% by weight of ECOFLAKES CB TH,
23.02% by weight of ethylene methyl acrylate copolymer (having a methyl acrylate content of 24% by weight),
4.60% by weight of ethylene/methyl acrylate/glycidyl methacrylate terpolymer (67/25/8),
2.30% by weight of antimony trioxide,
4.60% by weight of decabromodiphenylethane,
0.09% by weight of Irganox 1024,
0.09% by weight of Irganox 1010,
0.46% by weight of dioctadecyl 3,3'-thiodipropionate.

The extrusion was done so as to get the sleeve (coming from the polymeric matrix) thickness indicated in Table 1. This thickness is expressed as the outer diameter of the cable.

The following characteristics are measured on the cable according to the ISO 6722-1-2011 (E) standard:
flame propagation resistance;
abrasion resistance at 4N;
rupture under elongation according to the NF EN 60811-501 standard;
pressure resistance at high temperature;
resistance to hydrolysis and electrolysis;
low temperature winding;
thermal aging at 125° C. for 3000 hours.

The results of these tests are presented in Table 1 with the specific conditions and/or target values in the first column.

Example 2

In the same way as in example 1, a cable resulting by extrusion of a polymeric matrix having the following composition was prepared:
64.46% by weight of ECOPET CB TH,
23.02% by weight of ethylene methyl acrylate copolymer (having a methyl acrylate content of 24% by weight);
4.60% by weight of ethylene/methyl acrylate/glycidyl methacrylate terpolymer (67/25/8),
2.30% by weight of antimony trioxide,
4.60% by weight of decabromodiphenylethane,
0.09% by weight of Irganox 1024,
0.46% by weight of Irganox 1010,
0.46% by weight of dioctadecyl 3,3'-thiodipropionate.

The extrusion was done so as to get the sleeve thickness (coming from the polymeric matrix) indicated in Table 1. This thickness is expressed as the outer diameter of the cable.

The same properties as in Example 1 were measured on the cable.

The values obtained are gathered in Table 1.

Example 3

In the same way as an example 1, a cable was prepared by extrusion of a polymeric matrix having the following composition:
64.46% by weight of ECOPET CB,
23.02% by weight of ethylene methyl acrylate (24%) copolymer,
4.60% by weight of ethylene/methyl acrylate/glycidyl methacrylate terpolymer (67/25/8),
2.30% by weight of antimony trioxide,
4.60% by weight of decabromodiphenylethane,
0.09% by weight of Irganox 1024,
0.469% by weight of Irganox 1010,
0.46% by weight of dioctadecyl 3,3'-thiodipropionate.

The extrusion was done so as to get the sleeve thickness (coming from the polymeric matrix) indicated in Table 1. This thickness is expressed as the outer diameter of the cable.

The same properties as in Example 1 were measured on the cable.

The resulting values are gathered in Table 1.

Example 4

In the same way as an example 1, a cable was prepared from extrusion of a polymeric matrix having the following composition:
73.66% by weight of ECOFLAKES CB TH,
13.81% by weight of ethylene methyl acrylate copolymer (having a methyl acrylate content of 24% by weight),
4.60% by weight of ethylene/methyl acrylate/glycidyl methacrylate terpolymer (67/25/8),
2.30% by weight of antimony trioxide,
4.60% by weight of decabromodiphenylethane, 0.09% by weight of Irganox 1024,
0.46% by weight of Irganox 1010,
0.46% by weight of dioctadecyl 3,3'-thiodipropionate.

The extrusion was done so as to get the sleeve thickness (coming from the polymeric matrix) indicated in Table 1. This thickness is expressed as the outer diameter of the cable.

The same properties as in Example 1 were measured on the cable.

The resulting values are gathered in Table 1.

Example 5

The cable was prepared by extrusion of a polymeric matrix with the following composition around a copper strand:
73.66% by weight of ECOPET CB TH,
13.81% by weight of ethylene methyl acrylate (24%) copolymer,
4.60% by weight of ethylene/methyl acrylate/glycidyl methacrylate terpolymer (67/25/8),
2.30% by weight of antimony trioxide,
4.60% by weight of decabromodiphenylethane,
0.09% by weight of Irganox 1024,
0.46% by weight of Irganox 1010,
0.46% by weight of dioctadecyl 3,3'-thiodipropionate.

The extrusion was done so as to get the sleeve (coming from the polymeric matrix) thickness indicated in Table 1. This thickness is expressed as the outer diameter of the cable.

The same properties as in Example 1 were measured on the cable.

The resulting values are gathered in Table 1.

Example 6

The cable was prepared by extrusion of a polymeric matrix with the following composition around a copper strand:
73.66% by weight of ECOPET CB,
13.81% by weight of ethylene methyl acrylate (24%) copolymer,
4.60% by weight of ethylene/methyl acrylate/glycidyl methacrylate terpolymer (67/25/8),
2.30% by weight of antimony trioxide,
4.60% by weight of decabromodiphenylethane,
0.09% by weight of Irganox 1024,
0.46% by weight of Irganox 1010,
0.46% by weight of dioctadecyl 3,3'-thiodipropionate.

The extrusion was done so as to get the sleeve thickness (coming from the polymeric matrix) indicated in Table 1. This thickness is expressed as the outer diameter of the cable.

The same properties as in Example 1 were measured on the cable. The resulting values are gathered in Table 1.

TABLE 1

|  | Examples | | | | | |
| --- | --- | --- | --- | --- | --- | --- |
|  | 1 | 2 | 3 | 4 | 5 | 6 |
| Outer diameter in mm | 0.90 | 0.91 | 0.905 | 0.90 | 0.90 | 0.90 |
| Fire Flame application = 3 seconds (melting of core >4 seconds) | OK | OK | OK | OK | OK | OK |
| Average combustion time (<30 seconds) upper/lower in seconds | 1.84 s/1.12 s | 6.04 s/2.46 s | 2 s/1.14 s | 2.46 s/1.3 s | 3.96 s/3.08 s | 4.48 s/2 s |
| Average burn length R1 (upper)/R2 (lower) in mm (<100 mm) | 27/17 | 41/23 | 32/17 | 30/16 | 33/19 | 32/19 |
| Abrasion ≥125 cycles with 4N (210 g) weight | 205 | 549 | 221 | 706 | 1432 | 1374 |
| Elongation at rupture | 281% | 333% | 337% | 353% | 352% | 358% |
| Pressure at high temperature oven for 4 hours at 131° C. | OK | OK | OK | OK | OK | OK |
| voltage of 1 kV/1 minute + 4 hours in saline solution Hydrolysis and electrolysis submerged 35 days > 1000 MΩ · mm in a saline solution | OK | OK | OK | OK | OK | OK |
| Winding at −40° C. visual inspection 5 × Ø of the wire submersion 10 min + 1 kVdc/1 min | OK | OK | OK | OK | OK | OK |
| Aging > 3000 hours at 125° C. 1.5 × Ø of the wire Winding at ambient temperature (after 16 hours of rest) submersion for 10 minutes in saline solution | OK | OK | OK | OK | OK | OK |

The invention claimed is:

1. A polymeric matrix comprising:
   50 to 80% Poly(ethylene terephthalate) (PET), the PET comprising over 50% by weight of recycled PET;
   18 to 50% of polyolefins, the polyolefins consisting of a mixture of ethylene methyl acrylate copolymer and of ethylene/methyl acrylate/glycidyl methacrylate terpolymer;
   0.1 to 15% of flame-retardant additives, the flame retardant additives consisting of a mixture of antimony trioxide and decabromodiphenyl ethane;
   0.2 to 1% of antioxidants, the antioxidants consisting of a mixture of pentaerythritol tetrakis(3-(3,5-di-tert-butyl-4-hydroxyphenyl) propionate), 2',3-bis[3-[3,5-di-tert-butyl-4-hydroxyphenyl]propioyl] propionohydrazide, and dioctadecyl 3,3'-thiodipropionate;
   0 to 2% of at least one crosslinking promoter; and
   0 to 2% of at least one anti-hydrolysis agent,
   the percentages being by weight of the total weight of the matrix.

2. The polymeric matrix according to claim 1, wherein all of the PET is recycled.

3. The polymeric matrix according to claim 1, wherein the recycled PET comes from food packaging.

4. The polymeric matrix according to claim 1, wherein the polymer matrix does comprise at least one crosslinking promoter.

5. The polymeric matrix according to claim 1, wherein the polymeric matrix does not comprise a plasticizer.

6. An insulator for electrical conductor wires comprising the polymeric matrix as defined in claim 1.

7. A cable comprising at least one electrical conductor wire covered by a protective sleeve based on the polymeric matrix defined in claim 1.

8. Automotive cabling using the cable as defined in claim 7.

9. A method for preparation of a cable according to claim 7 comprising:
   preparing the polymeric matrix;
   extruding the matrix around an electrical conductor; and
   possibly crosslinking of the polymeric matrix.

10. A polymeric matrix comprising:
    64 to 73%, PET;
    20 to 28% of a mixture of polyolefins;
    0.5 to 7% of at least one flame-retardant additive;
    0.2 to 1% of at least one antioxidant;
    0.2 to 1% of at least one crosslinking promoter; and
    0.2 to 1% of at least one anti-hydrolysis agent,
    wherein the PET is over 50% by weight of recycled PET, and
    the percentages being by weight of the total weight of the matrix.

11. The polymeric matrix according to claim 1, wherein the polymeric matrix does comprise the at least one crosslinking promoter, and 1,3,5-triallylisocyanurate or trimethylolpropane trimethylacrylate is the crosslinking promoter.

12. The polymeric matrix according to claim 1, wherein the polymeric matrix does comprise the at least one anti-hydrolysis agent.

13. The polymeric matrix according to claim 1 comprising:
    64 to 73% of the PET;
    20 to 28% of the polyolefins;
    0.5 to 7% of the flame-retardant additives;
    0.2 to 1% of the antioxidants;
    0.2 to 1% of the at least one crosslinking promoter; and
    0.2 to 1% of the at least one anti-hydrolysis agent,
    wherein the percentages being by weight of the total weight of the matrix.

14. The polymeric matrix according to claim 1 comprising:
    64 to 73% of the PET, wherein all of the PET is recycled;
    20 to 28% of the polyolefins;
    0.5 to 7% of the flame-retardant additives;
    0.2 to 1% of the antioxidants; and
    the percentages being by weight of the total weight of the matrix.

* * * * *